Patented Nov. 30, 1943

2,335,730

UNITED STATES PATENT OFFICE 2,335,730

SPONGE RUBBER

Edward S. Blake, Nitro, W. Va., assignor to Monsanto Chemical Company, St. Louis, Mo., a corporation of Delaware No Drawing. Application November 9, 1940,
Serial No. 365,020

12 Claims. (Cl. 260—724)

The present invention relates to a new process for producing sponge or cellular rubber and more particularly to a new class of sponging agents and to rubber compositions containing the same.

One expedient commonly resorted to for the production of sponge rubber is to incorporate into the rubber a heat decomposable material and heat at such temperature that the rubber is expanded and rendered cellular by the gas liberated from the heat decomposable material. The present invention is directed to improvements in this general method of manufacturing sponge rubber. Ordinary baking soda is a familiar example of a sponging agent, its chief virtue being its cheapness but otherwise it fails to meet many of the requirements of a good sponging agent. For example baking soda is difficult to disperse into rubber and gives a coarse uneven blow. Furthermore, even relatively low proportions on the rubber impart a harsh "feel" to the rubber and adversely affect the cure with many accelerators. Thus, a material which will provide a high ratio of expansion and at the same time meet the other requirements of a good sponging agent has been in considerable demand.

It is an object of the present invention to provide a sponge rubber product of improved properties.

It is a further object to provide a sponge rubber product of uniform pore size and fine texture.

It is a further object of the invention to provide a class of compounds which, when incorporated into a typical rubber stock, produce an improved sponge rubber. Among the specific objects of the invention are to provide a class of sponging agents which will impart a high ratio of expansion to the rubber; will disperse readily into rubber; will not affect the cure and will provide firm sponge rubber products having a soft feel. Other and further objects will be shown hereinafter.

In accordance with this invention it has been discovered that certain organic compounds falling into the class of pentazdienes are excellent sponging agents. More particularly it has been found that the diaryl pentazdienes are heat decomposable materials suitable for use as sponging agents. The diaryl pentazdienes are characterized by the grouping Ar—N=N—N—N=N—Ar
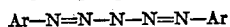

where Ar stands for aryl. They may be prepared by reacting a primary amine with two molecular proportions of an aromatic diazonium salt. Since this reaction and the pentazdienes produced thereby are well known resort may be had to the literature for details of the preparation. See for example Goldschmidt and Badl, Ber. 22, 934 (1889). This invention is not concerned with the preparation of the preferred materials and is not limited to any particular method of synthesis but pertains to the use as sponging agents of compounds possessing the structure

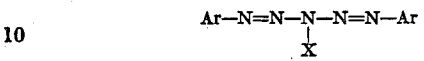

where Ar represents an aryl radical and X is an organic radical, as for example an alkyl or aryl radical, either of which may be substituted. In the preferred aspects of the invention X is an alkyl radical which may be substituted, preferably an alkyl radical containing less than five carbon atoms.

Typical examples of the new class of sponging agents comprise the following, the list being merely illustrative and in nowise limitative of the invention:

3 methyl 1,5 diphenylpentazdiene, 3 ethyl 1,5 diphenyl pentazdiene, 3 butyl 1,5 diphenyl pentazdiene, 3 cyclohexyl 1,5 diphenyl pentazdiene, 3 methyl 1,5 di-p-tolyl pentazdiene, 3 ethyl 1,5 di-p-tolyl pentazdiene, 3 β-hydroxy ethyl 1,5 di-p-tolyl pentazdiene, 3 butyl 1,5 di-p-tolyl pentazdiene, 3 methyl 1,5 di-p-chlor phenyl pentazdiene, 3-cyclohexyl 1,5 di-p-chlor phenyl pentazdiene, 3 β-hydroxy ethyl 1,5 di-p-chlor phenyl pentazdiene, bis 3(1,5 diphenyl pentazdiene) ethylene, 3 β-hydroxy ethyl 1,5 diphenyl pentazdiene, 1,3,5 triphenyl pentazdiene, 1,3,5 tri-p-tolyl pentazdiene and equivalents and analogues thereof.

The following example illustrates a procedure which may be followed for the preparation of pentazdiene useful for the manufacture of sponge rubber articles.

One hundred parts by weight of aniline were dissolved in a mixture of concentrated hydrochloric acid and water and cooled to 0° C. or below. Diazotization was carried out in the usual manner by adding sodium nitrite solution to the cold well stirred aniline hydrochloride solution until a slight excess was shown to be present by a positive test with starch iodide paper a short time after the last addition. One hundred parts by weight of methyl amine hydrochloride dissolved in dilute hydrochloric acid was then slowly added to the diazonium salt solution keeping the temperature below 5° C. When the reaction was complete the solution was carefully neutralized with dilute caustic or sodium carbonate solution, preferably the latter, and the precipitate that formed filtered off. The light brown reaction product comprising 3 methyl 1,5 diphenyl pentazdiene may be used directly as a sponging agent or where desired may be further purified by recrystallizing from hot alcohol.

Again other methods of preparation may be used where convenient or desirable. Thus, U. S. 2,188,262, issued George S. Crandall, discloses a number of methods of synthesis which have been employed for the preparation of pentazdienes.

As specific embodiments of the invention illustrative of the invention but in nowise limitative thereof a rubber base stock was compounded comprising

| | Parts by weight |
|---|---|
| Smoked sheets of rubber | 100 |
| Zinc oxide | 5 |
| Whiting | 30 |
| Sulfur | 3 |
| Mineral acid treated 2,2,4-trimethyl dihydro quinoline | 1 |
| Di(benzothiazyl thiol) dimethyl urea | 0.9 |
| Stearic acid | 2 |
| Oleic acid | 5 |
| A blended mineral and vegetable oil | 20 |

From the base stock so compounded rubber stocks were prepared by adding thereto various pentazdienes as follows:

| Stock | Pentazdiene | Parts by weight |
|---|---|---|
| A | 3-methyl 1,5 diphenyl | 1.0 |
| B | 3-ethyl 1,5 diphenyl | 1.0 |
| C | 3-butyl 1,5 diphenyl | 1.0 |
| D | 3-cyclohexyl 1,5 diphenyl | 1.0 |
| E | 3-methyl 1,5 di-p-tolyl | 1.0 |
| F | 3-ethyl 1,5 di-p-tolyl | 1.0 |
| G | 3-β hydroxy ethyl 1,5 di-p-tolyl | 1.0 |
| H | 3-butyl 1,5 di-p-tolyl | 1.0 |
| J | Bis(1,5 diphenyl pentazdiene 3-)ethylene | 1.0 |
| K | 3-methyl 1,5 di-p-chlor phenyl | 1.0 |

The above pentazdienes all dispersed easily and uniformly into the rubber compositions.

Moulds of suitable capacity were half filled with the stocks so compounded and a second series of moulds were one-third filled. The stocks were then cured in the usual manner by heating for twenty minutes at the temperature of sixty pounds steam pressure per square inch and the vulcanized sponge rubber products examined as to fineness and uniformity of pores as well as extent of sponging. It was found that in every case the moulds were completely filled and sponge rubber products possessing fine uniform pores produced.

As further illustrative of the invention sheets of the above described vulcanized sponge rubber stocks were placed on watch glasses dusted with zinc stearate and cured in dry heat at 155.5° C. and under twenty pounds air pressure. Under these conditions the stocks expanded from three to four times their original volume producing vulcanized sponge rubber of fine uniform pores. Under either conditions of cure the sponge rubber products were free of either surface hardness or tackiness and were firm and rubbery.

Obviously where a greater "blow" is desired larger proportions of the preferred class of materials may be employed. While the preferred class of materials are advantageously employed in relatively small proportions, other proportions than those specifically mentioned may be used. Furthermore the preferred class of materials may be used in other compositions than those specifically mentioned since the invention pertains broadly to any vulcanizable rubber or rubber like composition. For example the invention applies to sponge stocks from synthetic rubbers such as the neoprene and Buna rubbers as well as to other natural rubbers. Furthermore other compounding and vulcanizing ingredients than those specifically mentioned may be employed where convenient or desirable. This invention is limited solely by the claims attached hereto as part of the present specification.

What is claimed is:

1. The process of producing sponge rubber which comprises heating rubber and sulfur in the presence of a trisubstituted pentazdiene having an aryl radical attached to each of the two terminal nitrogen atoms of the five nitrogen chain and an organic radical on the nitrogen atom in the middle or 3 position, the proportion of said pentazdiene being sufficient to produce a sponge rubber product of uniform pore size and fine texture.

2. The process of producing sponge rubber which comprises heating rubber and sulfur in the presence of a pentazdiene characterized by the grouping

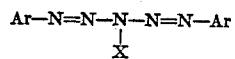

where Ar stands for aryl and X stands for a carbon atom of an organic radical, the proportion of said pentazdiene being sufficient to produce a sponge rubber product of uniform pore size and fine texture.

3. The process of producing sponge rubber which comprises heating rubber and sulfur in the presence of a pentazdiene possessing the structure

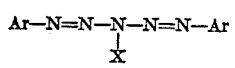

where Ar stands for a mononuclear aryl group and X stands for an alkyl group of less than five carbon atoms the proportion of said pentazdiene being sufficient to produce a sponge rubber product of uniform pore size and fine texture.

4. The process of producing sponge rubber which comprises heating rubber and sulfur in the presence of a pentazdiene possessing the structure

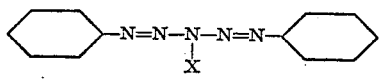

where X stands for an alkyl radical of less than five carbon atoms the proportion of said pentazdiene being sufficient to produce a sponge rubber product of uniform pore size and fine texture.

5. A vulcanized sponge rubber product obtained by heating rubber and sulfur in the presence of a trisubstituted pentazdiene having an aryl radical attached to each of the two terminal nitrogen atoms of the five nitrogen chain and an organic radical on the nitrogen atom in the middle or 3 position, the proportion of said pentazdiene being sufficient to produce a sponge rubber product of uniform pore size and fine texture.

6. A vulcanized sponge rubber product obtained by heating rubber and sulfur in the presence of a pentazdiene characterized by the grouping

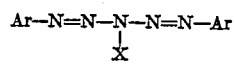

where Ar stands for aryl and X stands for a carbon atom of an organic radical, the proportion of said pentazdiene being sufficient to produce a sponge rubber product of uniform pore size and fine texture.

7. A vulcanized sponge rubber product obtained by heating rubber and sulfur in the presence of a pentazdiene possessing the structure

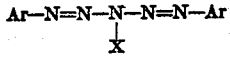

where Ar stands for aryl and X stands for an alkyl group the proportion of said pentazdiene being sufficient to produce a sponge rubber product of uniform pore size and fine texture.

8. A vulcanized sponge rubber product obtained by heating rubber and sulfur in the presence of a pentazdiene possessing the structure

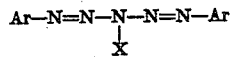

where Ar stands for aryl and X stands for an alkyl group of less than five carbon atoms the proportion of said pentazdiene being sufficient to produce a sponge rubber product of uniform pore size and fine texture.

9. A vulcanized sponge rubber product obtained by heating rubber and sulfur in the presence of a pentazdiene possessing the structure

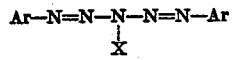

where Ar stands for a mononuclear aryl group and X stands for an alkyl group of less than five carbon atoms the proportion of said pentazdiene being sufficient to produce a sponge rubber product of uniform pore size and fine texture.

10. The process of producing sponge rubber which comprises heating rubber and sulfur in the presence of 3-β hydroxy ethyl 1,5 di-p-tolyl pentazdiene.

11. A vulcanized sponge rubber product obtained by heating rubber and sulfur in the presence of 3-β hydroxy ethyl 1,5 di-p-tolyl pentazdiene.

12. The process of producing sponge rubber which comprises heating rubber and sulfur in the presence of 3-β hydroxy ethyl 1,5 diphenyl pentazdiene.

EDWARD S. BLAKE.